US006941801B2

(12) United States Patent
Lemense et al.

(10) Patent No.: US 6,941,801 B2
(45) Date of Patent: Sep. 13, 2005

(54) TIRE PRESSURE MONITORING SYSTEM

(75) Inventors: Thomas J. Lemense, Farmington, MI (US); John S. Nantz, Brighton, MI (US); Kenneth J. Cunningham, Livonia, MI (US); Qingfeng Tang, Novi, MI (US)

(73) Assignee: Lear Corporation, Southfield, MI (US)

( * ) Notice: Subject to any disclaimer, the term of this patent is extended or adjusted under 35 U.S.C. 154(b) by 107 days.

(21) Appl. No.: 10/742,490

(22) Filed: Dec. 19, 2003

(65) Prior Publication Data

US 2005/0132792 A1 Jun. 23, 2005

(51) Int. Cl.[7] .............................................. E01C 23/00
(52) U.S. Cl. ...................................... 73/146; 340/440
(58) Field of Search ............................... 73/146–146.5; 340/440–444

(56) References Cited

U.S. PATENT DOCUMENTS

| | | | |
|---|---|---|---|
| 5,600,301 | A | 2/1997 | Robinson, III |
| 5,838,229 | A | 11/1998 | Robinson, III |
| 6,181,241 | B1 | 1/2001 | Normann et al. |
| 6,507,276 | B1 | 1/2003 | Young et al. |
| 6,696,935 | B2 * | 2/2004 | Bonardi et al. ............ 340/447 |
| 6,804,999 | B2 * | 10/2004 | Okubo ........................ 73/146 |
| 2003/0030553 | A1 | 2/2003 | Schofield et al. |
| 2004/0149025 | A1 * | 8/2004 | Toyofuku .................... 73/146 |

OTHER PUBLICATIONS

Jeff Burgess, Motorola Inc., *Tire Pressure Monitoring: An Industry Under Pressure*, Jul. 2003, pp. 1–5.
Atmel Corporation, *Interface IC for 125 kHz Wake–Up Function*, 2003, pp. 1–13.
Tier One, *Dyco Tire Pressure Monitoring Systems*, Oct. 24, 2001, pp. 1–18.
Atmel Corporation, *Tire–Pressure Monitoring (TPM) Products*, Jun. 2003, pp. 1–10.

* cited by examiner

*Primary Examiner*—William Oen
*Assistant Examiner*—Alandra Ellington
(74) *Attorney, Agent, or Firm*—MacMillan, Sobanski & Todd, LLC

(57) ABSTRACT

A method is provided for replacing at least one tire of a vehicle on a first wheel in a first wheel position, the vehicle having a tire pressure monitoring system with a first sensor unit having a first ID code mounted to the first wheel. The first sensor unit is interrogated. Either a nominal result or a faulted result of the interrogation is detected. The at least one tire is removed from the first wheel. If the nominal result is detected during the interrogating step, then the first sensor unit is re-interrogated. Either a nominal result or a faulted result of the re-interrogation is detected. If either of the interrogation or the re-interrogation provide a faulted result then the first ID code is cloned into a replacement sensor unit and then the replacement sensor unit is swapped for the first sensor unit on the first wheel. A new tire is installed onto the first wheel. The first wheel is installed onto the vehicle in the first wheel position.

10 Claims, 2 Drawing Sheets

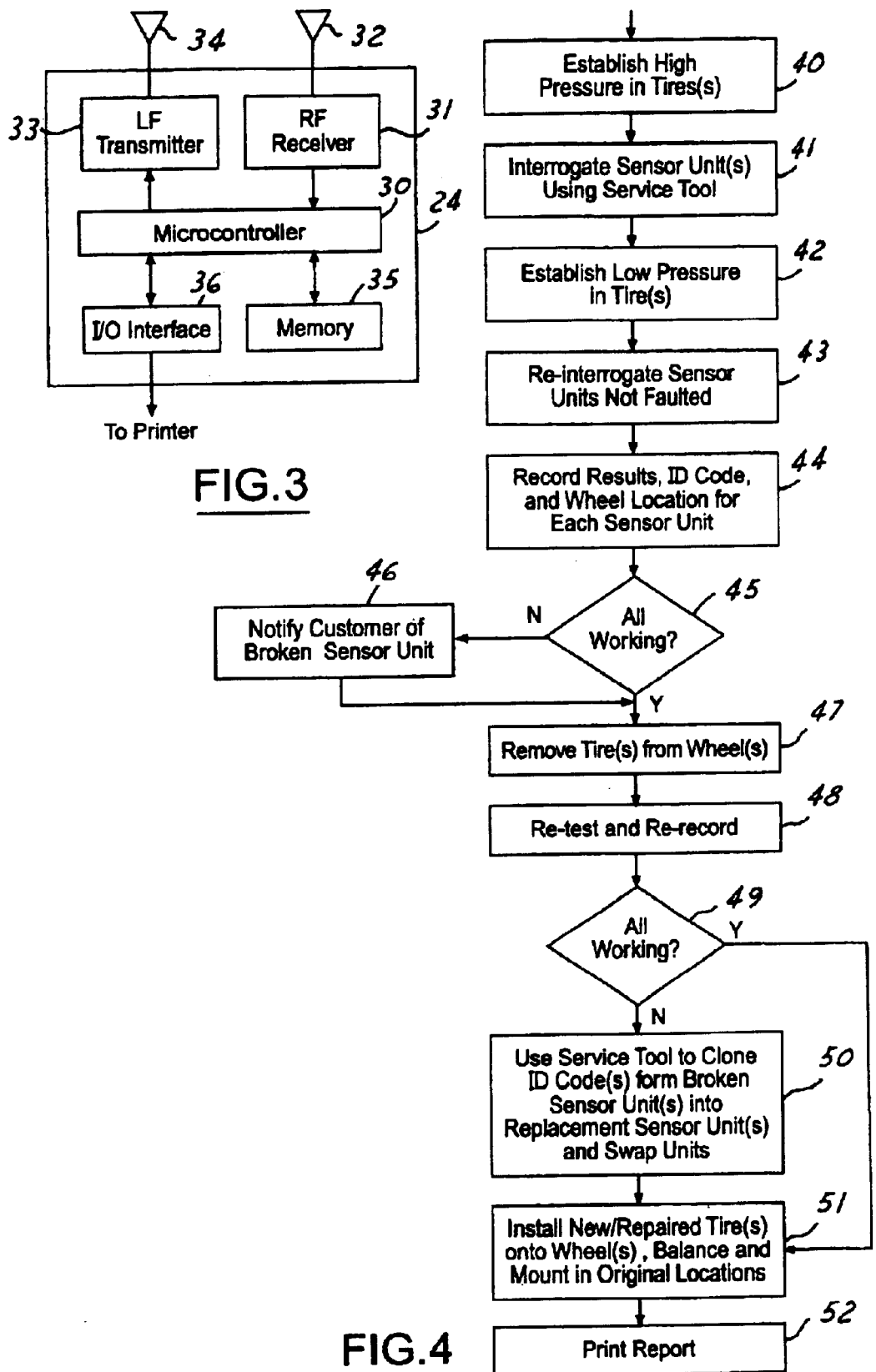

TIRE PRESSURE MONITORING SYSTEM

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to vehicular tire pressure monitoring systems, and, more specifically, to replacing or otherwise servicing tires mounted on wheels containing tire pressure sensing units.

Real-time tire pressure monitoring systems (TPMS) can be used for the tires of transportation vehicles such as motor vehicles to alert a driver when proper tire inflation is not being maintained. Proper tire inflation is important to increase tire life, maximize fuel economy, and optimize tire performance in terms of handling, braking distance, and tire integrity.

A self-contained pressure/temperature sensor unit is typically mounted to a wheel in communication with the interior of the tire, e.g., mounted on the wheel spider. Since the wheel and the pressurized interior of a tire are not stationary, the sensor unit usually utilizes a radio transmitter to provide sensor data to a control module in the vehicle. Since each wheel typically has its own respective sensor unit which communicates with a single control module and since nearby vehicles may use the same transmission frequencies and protocols, the sensor transmissions are differentiated by providing a unique ID code within each sensor which is included in the transmissions. The control module must be configured to associate certain ID codes with respective wheel positions on the vehicle (e.g., left-front, right-front, left-rear, and right-rear for a 4-wheel passenger vehicle). Thus, when a particular pressure sensor indicates that an inadequate pressure is being sensed in its respective tire, the control module can alert the driver as to which tire is affected.

The presence of sensor units of tire pressure monitoring systems in or on the wheels of vehicles gives rise to certain difficulties when tires or wheels are repaired or replaced. The act of removing a tire from a wheel may result in inadvertent damage to the sensor unit. If after tire or wheel servicing it is noticed that a sensor unit is inoperative, then it may be difficult or impossible to determine whether the unit was faulty prior to or during servicing. Yet responsibility for assuming the cost of replacing the sensor unit may depend on a determination of when the unit was damaged.

When a sensor unit is replaced, the control module of the prior art has been reconfigured with a new ID code embedded in the replacement sensor so that its transmissions can be associated with the correct wheel position on the vehicle. The control module is typically placed into a "learning mode" and the respective sensor units are made to transmit their ID codes in sequence to the control module. However, this process add time, complexity, and expense when servicing the TPMS system.

SUMMARY OF THE INVENTION

The present invention has the advantage of providing a simple and efficient process for servicing tires in a tire pressure monitoring system so that the time at which a pressure sensing unit was damaged can be determined and reconfiguring of the control module can be avoided.

In one aspect of the invention, a method is provided for replacing at least one tire of a vehicle on a first wheel in a first wheel position, the vehicle having a tire pressure monitoring system with a first sensor unit having a first ID code mounted to the first wheel. The first sensor unit is interrogated. Either a nominal result or a faulted result of the interrogation is detected. The at least one tire is removed from the first wheel. If the nominal result is detected during the interrogating step, then the first sensor unit is re-interrogated. Either a nominal result or a faulted result of the re-interrogation is detected. If either of the interrogation or the re-interrogation provide a faulted result then the first ID code is cloned into a replacement sensor unit and then the replacement sensor unit is swapped for the first sensor unit on the first wheel. A new tire is installed onto the first wheel. The first wheel is installed onto the vehicle in the first wheel position.

BRIEF DESCRIPTION OF THE DRAWINGS

FIG. 3 shows the service tool in greater detail.

FIG. 4 is a flowchart showing a preferred method of the present invention.

DETAILED DESCRIPTION OF PREFERRED EMBODIMENTS

Figure 1:
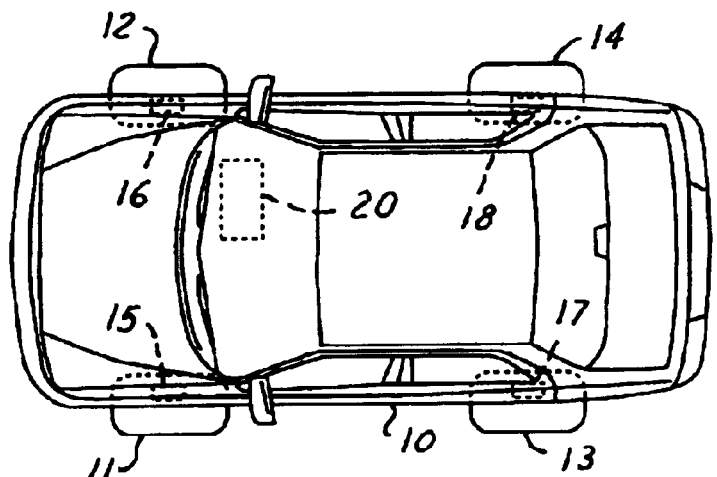
FIG. 1 is a schematic view of a vehicle having a tire pressure monitoring system.

Referring to FIG. 1, a vehicle 10 includes wheels 11–14 having pressure sensor units 15–18, respectively, mounted thereon. Each sensor unit preferably includes a sensing and signal processing section (for generating a data signal indicative of the tire inflation pressure—either a pressure measurement or an indication of pressure being above or below a threshold) and a communication section for transmitting the data signal and an ID code to a control module 20. Sensor units are known in the art, and may comprise commercially available, specialized components such as the MPXY8000 Series pressure and temperature sensor from Motorola, Inc. The RF link between the sensor units and control module 20 may utilize the same RF channel as is commonly used for remote keyless entry (RKE) systems for automobiles (e.g., a UHF channel at 315 MHz). As known in the art, control module 20 may integrate both the RKE and TPMS functions. Thus, the sensor units may include a commercially available microcontroller/transmitter component such as the MC68HC908RF2 MCU/transmitter chip, also from Motorola, for establishing a communication link from the sensor unit to the control module. For diagnostic and servicing purposes, the sensor unit may also include a wake-up receiver responsive to a low frequency (LF) signal to initiate execution of a sensing/transmission cycle or other predetermined routines. The LF receiver may be comprised of the ATA5283 wake-up receiver IC available from Amtel Corporation, for example, which responds to a 125 kHz wake-up signal.

Figure 2:
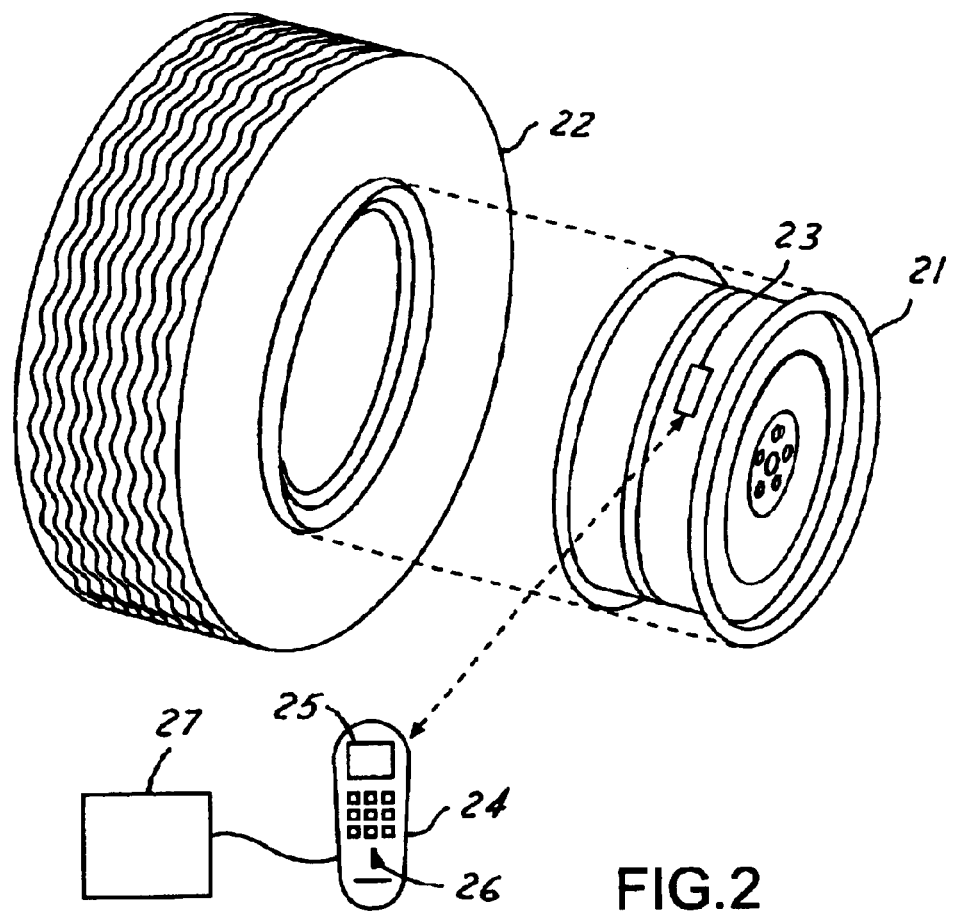
FIG. 2 shows a tire pressure sensing unit mounted to a wheel and being interrogated by a service tool.

As shown in FIG. 2, a sensor unit 23 is mounted to a wheel 21 so that it is exposed to the interior of a tire 22 when it is installed on wheel 21. A service tool 24 is utilized in the present invention for interacting with sensor unit 23 using the UHF radio link. It preferably includes a display 25 and a control keypad 26. It may further be coupled to a printer 27 in order to create written records showing the results of testing of the sensor units during tire servicing.

FIG. 3 shows service tool 24 in greater detail. A microcontroller 30 is coupled to an RF receiver 31 and to an LF transmitter 33. RF receiver 31 receives transmissions from a sensor unit via an antenna 32. LF transmitter 33 sends a wake-up signal under control of microcontroller 30 to a sensor unit via an antenna 34. Microcontroller 30 is coupled to a memory 35 for storing the results of testing (e.g., interrogating a sensor unit and evaluating the validity of its response) and to an I/O interface 36 which includes display 25, keypad 26, and a printing port for connecting to a printer.

Microcontroller 30 is programmed to perform various functions in order to interrogate a sensor unit that is placed within a close proximity (i.e., within the short range of the LF wake-up signal). An overall method of tire servicing according to the present invention is shown in FIG. 4. In order to establish a known pressure condition for testing a sensor unit, a full (i.e., high) pressure is established in a tire or tires to be serviced in step 40. The sensor unit(s) is (are) interrogated in step 41 using the service tool to send a wake-up command and to receive a data signal and ID code from each sensor unit involved in the tire replacement or repair. By comparing the data signal (i.e., pressure measurement or pressure range indication) with that expected in view of the full pressure present in the tire, the result of each interrogation can be classified by the service tool as a nominal result of a faulted result. A below normal (i.e., low) pressure is established in the tire or tires being serviced in step 42. The sensor unit(s) is (are) re-interrogated in step 41 again using the service tool and the result(s) of the re-interrogation(s) are classified. In step 44, the nominal or faulted results are recorded in memory by the service tool along with the respective ID codes and wheel locations (i.e., left-front, right-front, left-rear, right-rear).

In step 45, either a tire service technician or the service tool itself makes a determination whether all sensor units for all tires being serviced are working properly. If not, then a vehicle owner or customer is notified of the broken sensor unit in step 46, prior to actually beginning to service the tire. Thus, it can be clearly established that breakage of the sensor unit was not caused during servicing of the tire. The notification may include a printed report of the results stored in the memory of the service tool.

In step 47, the tire service technician proceeds to remove the tire(s) from the wheel(s). During time removal, inadvertent damage may occur to the sensor unit because of the prying or jarring that may be required to break the tire seal and clear the tire over the wheel rims. After tire removal, the sensor unit(s) are re-tested and the corresponding results are recorded in step 48. A check is made in step 49 to determine whether all the sensor units on wheels being serviced are working properly.

In step 50, any non-working sensor units are replaced. Preferably, the service tool is used to replicate or clone the ID code of a broken sensor unit into a replacement sensor unit over a LF communication link between the service tool and the replacement sensor unit. The replacement sensor unit is swapped with the original (faulted) sensor unit by mounting the replacement to the corresponding wheel prior to re-installing a tire. If sensor unit damage prevents RF communication, then the corresponding ID code may be determined by other means (e.g., reading from a printed label on the sensor unit or obtaining the stored ID code from the control unit) and may then be programmed into the replacement sensor by the service tool. The sensor units may preferably be comprised of a universal replacement sensor of the type described in co-pending U.S. application serial number (Lear attorney docket 4056).

In step 51, a new or repaired tire is installed onto each wheel being serviced. The wheels are balanced and then mounted in their original locations. Consequently, there is no need to reconfigure the correlation of ID codes with wheel locations stored in the control unit since these have not changed even if a sensor unit has been replaced. It may be desirable to retest each sensor after mounting to ensure that each is still functioning using the same test procedure shown in steps 40 through 43. If desired, a final-report describing the results of the testing and replacement of sensor units can be printed in step 52.

What is claimed is:

1. A method of replacing at least one tire of a vehicle on a first wheel in a first wheel position, said vehicle having a tire pressure monitoring system with a first sensor unit having a first ID code mounted to said first wheel, said method comprising the steps of:

interrogating said first sensor unit;

detecting either a nominal result or a faulted result of said interrogation;

removing said one tire from said first wheel;

if said nominal result is detected during said interrogating step, then re-interrogating said first sensor unit;

detecting either a nominal result or a faulted result of said re-interrogation;

if either of said interrogation or said re-interrogation provide a faulted result then cloning said first ID code into a replacement sensor unit and swapping said replacement sensor unit for said first sensor unit on said first wheel;

installing a new tire onto said first wheel; and installing said first wheel onto said vehicle in said first wheel position.

2. The method of claim 1 wherein said interrogating step and said re-interrogating step each comprises the steps of:

transmitting a low-frequency command from a service tool to said first sensor unit;

said first sensor unit transmitting a radio-frequency response message including sensor data and said first ID code; and said service tool receiving said radio-frequency response message.

3. The method of claim 1 wherein said interrogating step comprises the steps of:

establishing a high pressure in said one tire;

transmitting a low-frequency command from a service tool to said first sensor unit;

said first sensor unit transmitting a first radio-frequency response message including sensor data and said first ID code;

said service tool receiving said first radio-frequency response message;

establishing a low pressure in said one tire;

transmitting a low-frequency command from said service tool to said first sensor unit;

said first sensor unit transmitting a second radio-frequency response message including sensor data and said first ID code; and said service tool receiving said second radio-frequency response message.

4. The method of claim 3 wherein said first detecting step comprises comparing said sensor data in said first and second radio-frequency response messages with predetermined data.

5. The method of claim 1 further comprising the step of:
recording said results of said interrogation and said re-interrogation to establish involvement of said removing step in any faulted result.

6. A method of replacing a plurality of tires of a vehicle on respective wheel in respective wheel positions, said vehicle having a tire pressure monitoring system with respective sensor units having respective ID codes mounted to said respective wheels, said method comprising the steps of:
sequentially interrogating said respective sensor units;
detecting either a nominal result or a faulted result of each of said interrogations;
removing said plurality of tires from said respective wheels;
re-interrogating said respective sensor units for which a nominal result was detected during said respective interrogations;
detecting either a nominal result or a faulted result of each of said re-interrogations;
if either of said interrogation or said re-interrogation for a respective sensor unit provide a faulted result then cloning said respective ID code of said respective sensor unit into a replacement sensor unit and swapping said replacement sensor unit for said respective sensor unit on said respective wheel;
installing a respective new tire onto each of said respective wheels; and
installing said respective wheels onto said vehicle in their respective wheel positions.

7. The method of claim 6 wherein said interrogating steps and said re-interrogating steps each comprise the steps of:
transmitting a low-frequency command from a service tool to a respective sensor unit;
said respective sensor unit transmitting a radio-frequency response message including sensor data and said respective ID code; and
said service tool receiving said radio-frequency response message.

8. The method of claim 6 wherein said interrogating steps each comprise the steps of:
establishing a high pressure in a respective tire;
transmitting a low-frequency command from a service tool to said respective sensor unit;
said respective sensor unit transmitting a first radio-frequency response message including sensor data and said respective ID code;
said service tool receiving said first radio-frequency response message;
establishing a low pressure in said respective tire;
transmitting a low-frequency command from said service tool to said respective sensor unit;
said respective sensor unit transmitting a second radio-frequency response message including sensor data and said respective ID code; and
said service tool receiving said second radio-frequency response message.

9. The method of claim 8 wherein said first detecting step comprises comparing said sensor data in said first and second radio-frequency response messages with predetermined data.

10. The method of claim 6 further comprising the step of:
recording said results of said interrogation and said re-interrogation to establish involvement of said removing step in any faulted result.

* * * * *